(12) United States Patent
Bissett

(10) Patent No.: US 6,819,264 B2
(45) Date of Patent: Nov. 16, 2004

(54) CABIN SITUATION ALERT SYSTEM

(76) Inventor: Richard L. Bissett, 448 Mason Ridge Dr., St. Charles, MO (US) 63304

( * ) Notice: Subject to any disclaimer, the term of this patent is extended or adjusted under 35 U.S.C. 154(b) by 0 days.

(21) Appl. No.: 10/043,706

(22) Filed: Jan. 14, 2002

(65) Prior Publication Data
US 2003/0132859 A1 Jul. 17, 2003

(51) Int. Cl.[7] .............................................. G08B 21/00
(52) U.S. Cl. ................. 340/945; 340/573.1; 340/426.1; 340/539.1; 340/506; 244/118.5
(58) Field of Search ............................ 340/945, 573.1, 340/426.1, 539.1, 539.11, 506, 825.69, 825.72; 244/118.5; 455/431; 701/2, 3

(56) References Cited

U.S. PATENT DOCUMENTS

| | | | | |
|---|---|---|---|---|
| 4,742,336 A | * | 5/1988 | Hall et al. ............. | 340/539.11 |
| 5,479,479 A | * | 12/1995 | Braitberg et al. ........ | 455/404.1 |
| 5,642,413 A | * | 6/1997 | Little .................... | 379/374.02 |
| 5,739,746 A | * | 4/1998 | Shaffer et al. ........... | 340/425.5 |
| 5,833,100 A | * | 11/1998 | Kim ........................... | 224/197 |
| 6,195,009 B1 | * | 2/2001 | Irizarry et al. .......... | 340/573.4 |
| 6,405,975 B1 | * | 6/2002 | Sankrithi et al. .......... | 244/1 R |
| 6,676,078 B2 | * | 1/2004 | Cordina et al. .......... | 244/118.5 |

* cited by examiner

Primary Examiner—Anh V. La
(74) Attorney, Agent, or Firm—Henry M. Cummings

(57) ABSTRACT

Each flight attendant would carry a small portable receiver/transmitter device, similar in size to a pager, and a central receiver/transmitter located in the cockpit. Each portable receiver/transmitter has a numerical designation (1, 2, 3, etc.) which is unique to that one device. The portable receiver/transmitter has two buttons (yellow alert and red alert), a numerical display, indicator lights, and a vibrator. In a developing situation, a nearby flight attendant presses either the yellow or red alert button (depending on the severity of the situation), producing a radio frequency (RF) signal. The central receiver/transmitter receives, processes, and re-broadcasts the signal to all other portable receiver/transmitters worn by flight attendants. The portable receiver/transmitters vibrate to alert the wearers to the situation. A light (either red or yellow) illuminates on all portable receiver/transmitters, and the numerical designation of the sending receiver/transmitter appears on the displays. In addition, a light corresponding to the sending receiver/transmitter's numerical designation appears on the central receiver/transmitter, as well as an audible alarm sound.

34 Claims, 4 Drawing Sheets

CABIN SITUATION ALERT SYSTEM

I FIELD OF THE INVENTION

This invention relates to warning and communications systems, particularly for use in airborne commercial aircraft to alert the flight (cockpit) crew and flight attendants of a potentially dangerous situation in the passenger compartment (cabin).

II BACKGROUND OF THE INVENTION

During a routine airline flight, situations can develop in the cabin that could potentially endanger all persons on board the aircraft. These situations might involve equipment failure resulting in smoke and/or fire, an ill or disruptive passenger, or a hijacking. A flight attendant must notify the cockpit crew and the other flight attendants of this situation, but he or she may not be able to use the normal cabin interphone system to do so.

The Cabin Situation Alert System (CSAS) is designed to immediately inform the cockpit crew and cabin crew of a developing situation in the cabin without using the normal interphone system. In most cabin emergencies times of notification and response were found to be the most critical factors in whether lives were saved or lost. As walls between flight decks and cabins are added and strengthened, the need arises for better, faster, and more numerous avenues of communication between all crew members. The lack of effective communication must be eliminated as a causal factor in aircraft incidents or accidents.

III SUMMARY OF THE INVENTION

A. Objects of the Invention

One object of the present invention is to provide a means for one or more members of an airline cabin crew to alert all other crewmembers of a developing hazardous situation.

Another object of the invention is to provide a means to identify the individual sounding the alarm in order to enable others to aid that individual.

Another object of the invention is to provide a storage location for the portable receiver/transmitters which allows testing of the units and recharging of their batteries.

Another object of the invention is to prevent inadvertent removal of remote units from the aircraft.

B. Summary

Each flight attendant would carry a small portable receiver/transmitter device, similar in size to a pager, and a central receiver/transmitter located in the cockpit. Each portable receiver/transmitter has a numerical designation (1, 2, 3, etc.) which is unique to that one device. The portable receiver/transmitter has two buttons (yellow alert and red alert), a numerical display, indicator lights, and a vibrator. In a developing situation, a nearby flight attendant presses either the yellow or red alert button (depending on the severity of the situation), producing a radio frequency (RF) signal. The portable receiver/transmitter unit includes means to transmit a signal to said central receiver/transmitter unit, and/or to other portable receiver/transmitter units. The central receiver/transmitter receives, processes, and re-broadcasts the signal to all other portable receiver/transmitters worn by flight attendants. The portable receiver/transmitters vibrate to alert the wearers to the situation. A light (either red or yellow) illuminates on all portable receiver/transmitters, and the numerical designation of the sending receiver/transmitter appears on the displays. In addition, a light corresponding to the sending receiver/transmitter's numerical designation appears on the central receiver/transmitter, as well as an audible alarm sound.

With the information provided by their portable receiver/transmitter, other members of the cabin crew can come to the aid of the person sending the distress signal. Based on the severity of the alert, the cockpit crew can weigh their options, prepare for voice communications from the cabin crew, and act accordingly to prescribed airline procedures.

In addition to the portable units, a series of hidden, guarded buttons (similar to a silent alarm in a bank) may be located at strategic points within the cabin. In a situation as previously described, a nearby crew member can actuate a button. This will cause a light corresponding to the button's location to illuminate on a cockpit mounted display.

There may also be some provisions to detect the proximity of the portable units so as to prevent their being inadvertently removed from the aircraft.

IV THE DRAWINGS

V DESCRIPTION OF PREFERRED EMBODIMENTS

Figure 1:
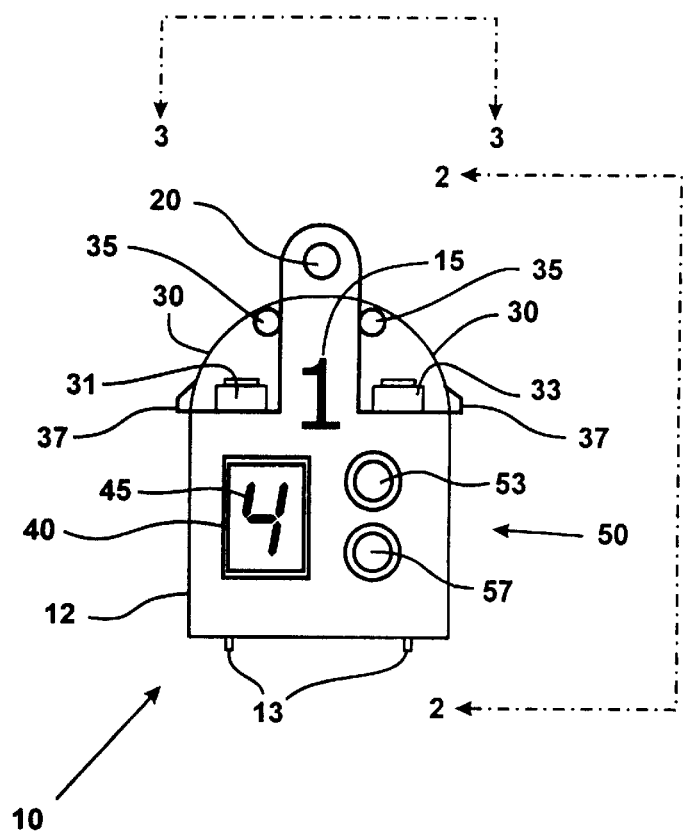
FIG. 1 is a front view of the portable receiver/transmitter.
Figure 2:
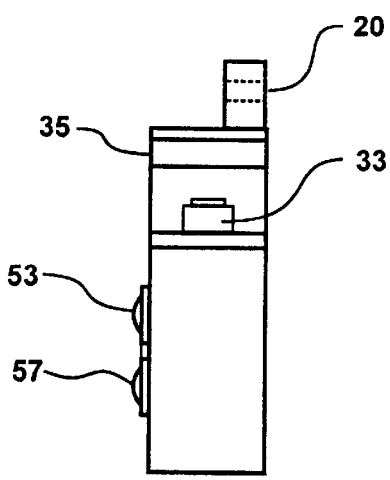
FIG. 2 is a side view of the portable receiver/transmitter.
Figure 3:
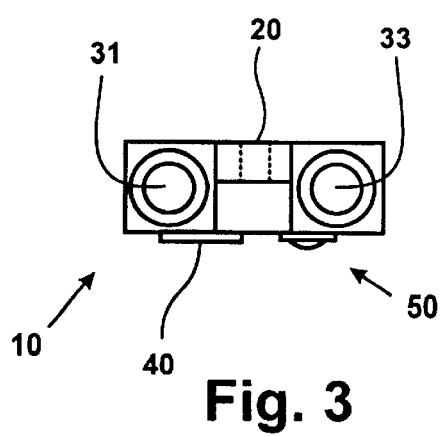
FIG. 3 is a top view of the portable receiver/transmitter.

In accordance with the present invention, FIGS. 1, 2, and 3 show the portable receiver/transmitter 10. All components are contained within or mounted to case 12, which is made of high-impact plastic or other suitable material. Portable receiver/transmitter 10 is secured around a flight attendant's neck or to his or her belt by means of lanyard attach point 20. Portable receiver/transmitter 10 is identified by its numerical designator 15. Red alert button 33 and yellow alert button 31 are protected from inavertent actuation by protective covers 30, which may be made of clear or opaque high impact plastic or other suitable material. Thumb tabs 37 provide means to easily open protective covers 30, which pivot on hinges 35. Lights 50 comprise a red light 53 and a yellow light 57. These lights illuminate in response to the actuation of the red or yellow alert button on another portable receiver/transmitter. Display 40 has a numerical indication 45 of which other portable receiver/transmitter has been activated by its user.

Figure 4:
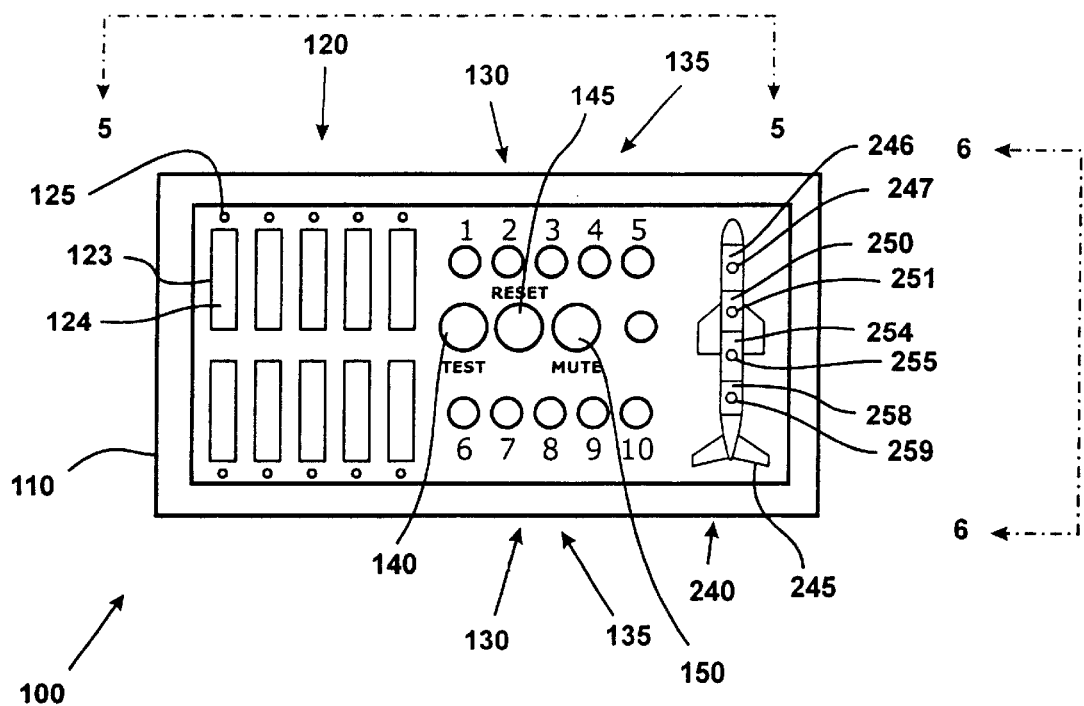
FIG. 4 is a front view of the central receiver/transmitter.
Figures 5, 6:
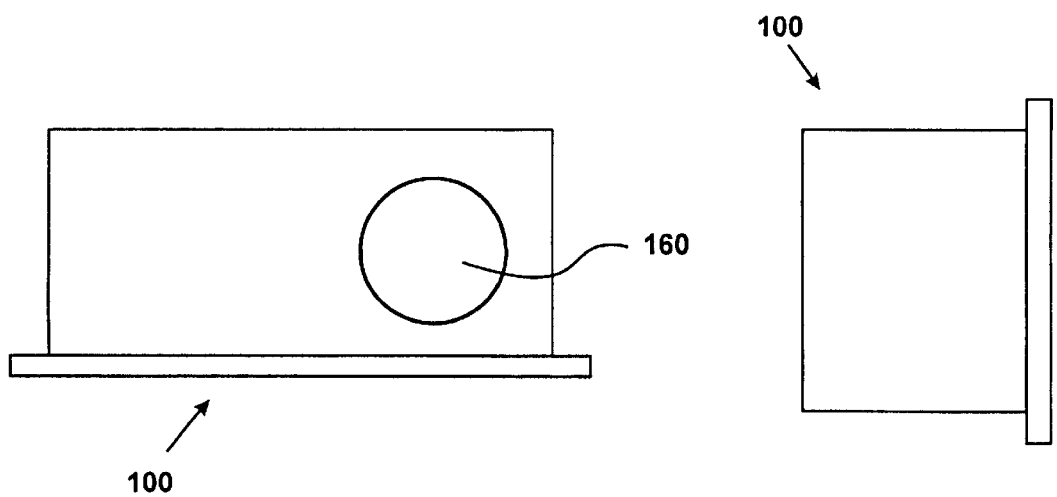
FIG. 5 is a side view of the central receiver/transmitter.
FIG. 6 is a top view of the central receiver/transmitter.
Figure 7:
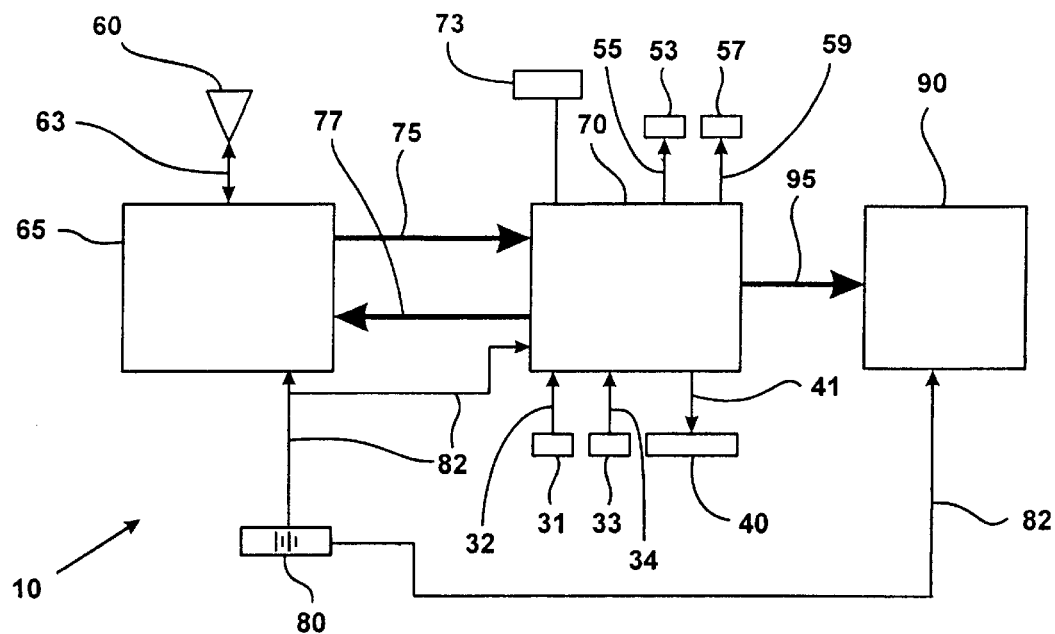
FIG. 7 is a simplified functional block diagram of the portable receiver/transmitter.
Figure 8:
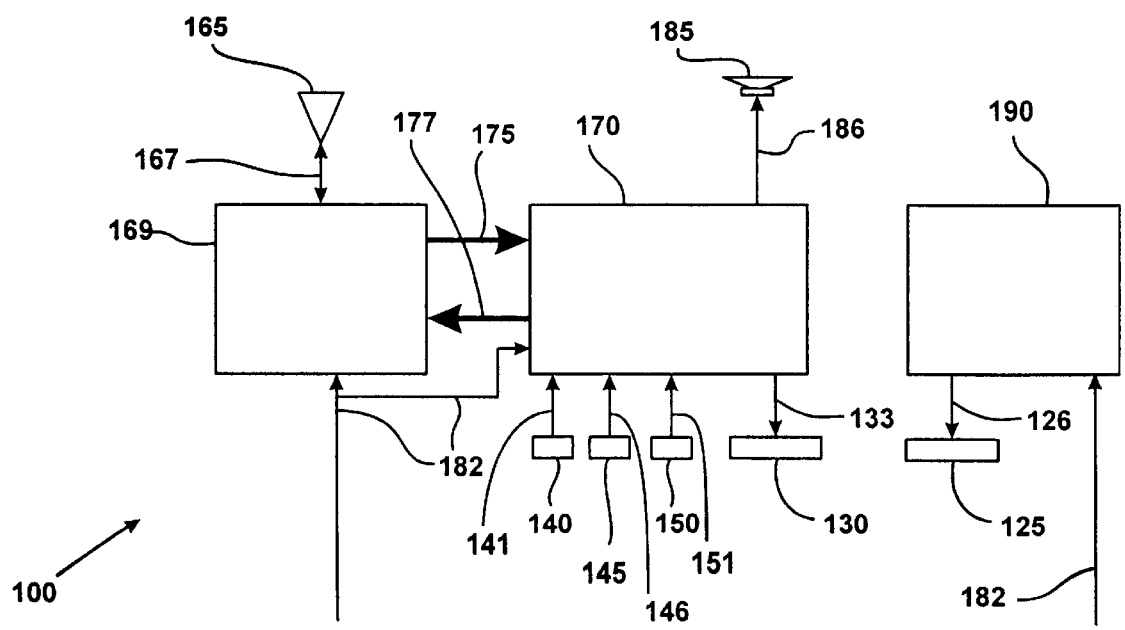
FIG. 8 is a simplified functional block diagram of the central receiver/transmitter.
Figure 9:
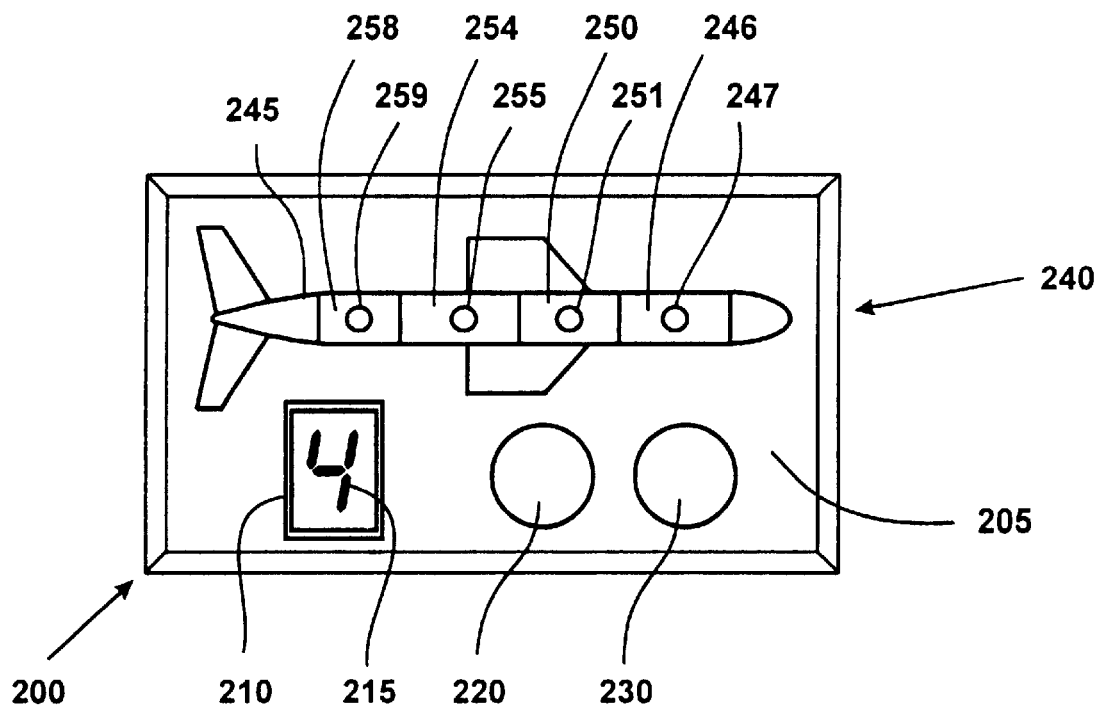
FIG. 9 is a view of an optional instrument panel-mounted display containing red and yellow alert lights, as well as a schematic representation of the aircraft.
Figure 10:
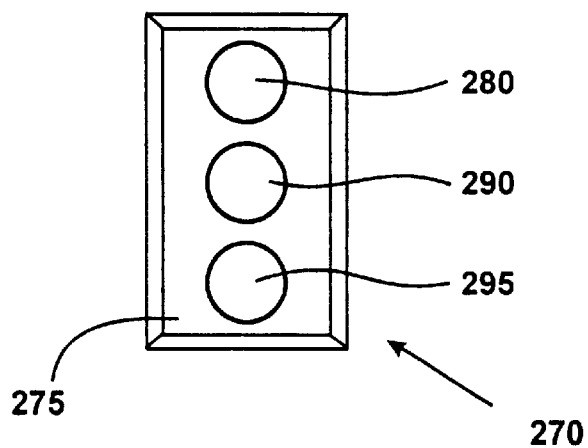
FIG. 10 is a view of a smaller optional instrument panel-mounted display containing red and yellow alert lights and a mute button only.

FIGS. 4, 5, and 6 show the central receiver/transmitter 100. All components are contained within or mounted to case 110, which may be made of metal, high-impact plastic, or other suitable material. Central receiver/transmitter 100 is mounted in a prominent location within the flight deck of an airliner. Central receiver/transmitter 100 comprises recharger/testing slots 120, charging/testing indicator lights 125, alert lights 130, alert light unit designators 135, test button 140, reset button 145, mute button 150, and alarm speaker grill 160.

In a potentially hazardous situation, a flight attendent presses either yellow alert button 31 or red alert button 33. The signal 32 from yellow alert button 31, or the signal 34 from red alert button 33 is routed to processor section 70. A unique code for this specific portable receiver/transmitter is established in processor 70 by means of dual inline package (DIP) switches 73. The code is a digital pulse train including the unit's individual numerical designator, and whether the red or yellow alert button was pressed. This code is sent to receiver transmitter section 65 via data line 77. The code is then applied to an RF signal, which is sent to antenna 60 via line 63. A rechargable battery 80 provides electrical power 82 to all subassemblies of portable receiver/transmitter 10. The RF signal from the sending portable receiver/transmitter is received by central receiver/transmitter 100, and/or by to one or more of of the antennas 165, which are located in various locations within the aircraft cabin. The signal is routed to receiver/transmitter section 169 via line 167. Receiver/transmitter section 169 detects the signal and sends the intelligence (digital pulse train) to processor section 170 via data line 175. Processor section 170 decrypts the coded pulse train to determine which portable receiver/transmitter unit sent the signal, and whether it is a red or yellow alert. The appropriate signal is sent to the corresponding yellow or red signal light 130 via line 133, which illuminates to display which portable receiver/transmitter sent the alert. Another signal is sent to speaker 185 via line 186 to provide an aural warning to alert the flight crew of the situation. All subsections of central receiver/transmitter 100 is supplied with electrical power 182 via the existing aircraft power bus. If the cockpit crew so desires, the aural signal can be muted by pressing mute button 150.

The received signal is once again encoded by processor section 170 and routed to receiver/transmitter 169 via line 177. The code is then applied to an RF signal, which is sent to all antennas 165 via line 167, and broadcast throughout the aircraft.

The RF signal from the central receiver/transmitter is received by all other portable receiver/transmitters. The RF signal arrives at antenna 60 and is routed to receiver/transmitter section 65 via line 63. Receiver/transmitter section 65 detects the signal and sends the intelligence (digital pulse train) to processor section 70 via data line 75. Processor section 70 decrypts the coded pulse train to determine which portable receiver/transmitter unit sent the signal, and whether it is a red or yellow alert. The appropriate data is sent to display 40 via line 41 to enable it to display the proper numerical designator for the sending portable receiver/transmitter. Another signal is sent to red light 53 via line 55, or yellow light 57 via line 59, depending on which alert level was received. A signal is also sent to vibrator 90 via line 95, which provides a tactile alert to the wearer of the portable receiver/transmitter.

When not in use, portable receiver/transmitters 10 are stored in recharge/testing slots 120. The portable receiver/transmitter fits into a recharger opening 123, which contains contacts 124 corresponding to contacts 13 on portable receiver/transmitter 10. These contacts supply electrical power to recharge battery 80. A full charge of battery 80 is indicated by an illuminated charging/testing indicator lamp 125 adjacent to the appropriate recharger opening 123. Pressing test button 140 sends a test signal to processor section 170, which encodes a pulse train. This pulse train is routed to receiver/transmitter section 169 via line 177. The pulse train is applied to a radio frequency (RF) signal, which is sent to antenna 165 via line 167. Any portable receiver/transmitter which is inserted in recharger opening 123 receives this signal. Each portable receiver/transmitter responds with its own unique numerical identifier code, which is decoded in a similar fashion as to normal operation. Proper operation of the units under test may be seen when the corresponding charging/testing indicator lamp 125 changes color. The responding displays from the portable receiver/transmitters can be cancelled by pressing reset button 145.

If a flight attendent becomes separated from his or her portable receiver/transmitter, he or she may press any one of a series of buttons located throughout the aircraft. These buttons are hidden and guarded, similarly to a silent alarm button in a bank. A signal from one of the buttons is routed to a display which is part of central receiver/transmitter 100. This display comprises aircraft schematic 240, which shows aircraft silhouette 245 broken up into a plurality of sections 246, 250, 254, 258. Each section has an indicator light 247, 251, 255, 259, which will illuminate when the button in that section of the aircraft is actuated. In addition, the same aural warning tone is activated, alerting the cockpit crew to the situation. In addition to the display included on the front of central receiver/transmitter 100, a remote display may be mounted to the aircraft instrument panel to provide a more visible report of the situation.

The remote display is generally shown at 200. Remote display 200 comprises faceplate 205, digital display 210, red light 220, yellow light 230, and aircraft schematic 240. Upon receipt of a signal from a button located in the aircraft cabin, the light 247, 251, 255, 259 corresponding to the actuated button illuminates, indicating in which cabin section 246, 250, 254, 258 the button was actuated. Remote display 200 will also display a red light 220 or yellow light 230, based on the severity of a situation reported by a portable receiver/transmitter. Display 210 will indicate which portable receiver/transmitter was actuated by a numerical display 215.

If there is insufficient panel space to mount remote display 200, small remote display 270 may be used. Small remote display 270 comprises faceplate 275, red light 280, yellow light 290, and mute button 295. The red or yellow light illuminates depending upon the severity of the situation in the cabin. Mute button 295 may be pressed to silence the aural warning tone.

To reduce the possibility of inadvertently removing a portable receiver/transmitter from the aircraft, sensors may be mounted at all aircraft doorways. These sensors will cause the portable receiver/transmitter unit to vibrate, alerting the wearer that he or she is removing the unit from the aircraft. Alternately, if the sensor detects that a portable receiver/transmitter is about to be removed from the aircraft, an aural tone may be sounded at the central receiver/transmitter.

What is claimed is:

1. An aircraft mounted cabin situation alert system (CSAS) comprising:

A central receiver/transmitter unit;

a plurality of portable receiver/transmitter units;

hidden, guarded buttons in various locations in the aircraft;

a system to prevent inadvertent removal of said portable receiver/transmitter units from the aircraft;

instrument panel-mounted displays, at least one of which is mounted in the cockpit area of a commercial airliner and comprising means for receiving and displaying data including situation alert data from said portable receiver/transmitter units comprising an antenna, a receiving assembly, and a processor section; said receiving assembly being capable of detecting digitally coded radio frequency signals transmitted by said portable receiver/transmitter units and supplying said detected signals to said processor section; said means for displaying data comprising a plurality of colored lights and an audible warning tone to attract the attention of the cockpit crew.

2. An aircraft mounted cabin situation alert system (CSAS) according to claim 1 comprising:
an antenna which is shielded to prevent interference with other aircraft systems.

3. An aircraft mounted cabin situation alert system (CSAS) according to claim to claim 1 including canceling means for the user to cancel any displayed information by means of controls on its front panel.

4. An aircraft mounted cabin situation alert system (CSAS) according to claim 1 including means to test, store, and recharge said portable receiver/transmitter units.

5. An aircraft mounted cabin situation alert system (CSAS) according to claim 4 wherein said means to test said portable receiver/transmitter units comprise a push-to-test button mounted on the front panel of said central receiver/transmitter unit, and electrical circuitry allowing only the testing of said portable receiver/transmitter units which are physically inserted in said central receiver/transmitter unit.

6. An aircraft mounted cabin situation alert system (CSAS) according to claim 4 wherein said means to store and recharge said portable receiver/transmitter units comprise recessed slots in the front panel of said central receiver/transmitter unit.

7. An aircraft mounted cabin situation alert system (CSAS) according to claim 6 wherein said recessed slots in the front panel of said central receiver unit comprise contact points to transfer electrical power from said central receiver/transmitter unit to recharge the batteries of said portable receiver/transmitter units.

8. An aircraft mounted cabin situation alert system (CSAS) according to claim 1 comprising means to prevent inadvertent removal of said portable receiver/transmitter units comprising sensors mounted at aircraft doorways.

9. An aircraft mounted cabin situation alert system (CSAS) according to claim 8 wherein said sensors have sending means to send a signal to said portable receiver/transmitter unit, and for activating its vibrator to alert the wearer that it is about to be removed from the aircraft.

10. An aircraft mounted cabin situation alert system (CSAS) according to claim 9 wherein said sending means will send a signal to said central receiver/transmitter unit to activate an aural alarm.

11. A portable receiver/transmitter unit according to claim 10 wherein said signal activates instrument panel-mounted displays which provide a visible indication of a potential emergency situation.

12. An aircraft mounted cabin situation alert system according to claim 1 comprising an antenna which is shielded to prevent interference with other aircraft systems, and is adapted to be installed in various locations in the aircraft to facilitate ease of receiving signals from and transmitting signals to said portable receiver/transmitter units.

13. A portable receiver/transmitter unit adapted to be worn on the person of a flight attendant or other cabin crewmember comprising:
a portable receiver/transmitter unit;
means for allowing a flight attendant or other cabin crew to wear said portable receiver/transmitter unit;
means to prevent inadvertent removal of said portable receiver/transmitter unit from the aircraft;
means to transmit a signal comprising at least two buttons, a coded identifier, a processor section, a transmitter section, and an antenna;
said at least two buttons permitting the user to transmit a signal based on the severity of the situation, including but not limited to, yellow alert and red alert.

14. A portable receiver/transmitter unit according to claim 13 having a rechargable battery.

15. A portable receiver/transmitter unit according to claim 13 wherein said means for allowing a flight attendant or other cabin crew to wear said portable receiver/transmitter unit comprises a member selected from a lanyard attach point, and a belt clip.

16. A portable receiver/transmitter unit according to claim 13 having means to transmit a signal to a central receiver/transmitter unit.

17. A portable receiver/transmitter unit according to claim 16 having means to transmit a signal to said central receiver/transmitter unit, and to other portable receiver/transmitter units.

18. A portable receiver/transmitter unit according to claim 16 having means to prevent actuation of said buttons comprising a removable cover.

19. A portable receiver/transmitter unit according to claim 16 having means to program, by means of DIP switches, a digital value corresponding to a printed number on the face of said portable receiver/transmitter unit; said coded identifier adapted to be used by other portable receiver/transmitter units and the central receiver/transmitter unit to identify which portable receiver/transmitter unit is activated.

20. A portable receiver/transmitter unit according to claim 19 having processor means for producing a pulse train composed of said coded identifier and a code based on the severity of the alert, and having routing means to rout it to said transmitter unit.

21. A portable receiver/transmitter unit according to claim 20 having acceptor means for accepting said pulse train and for adding it to a radio frequency signal.

22. A portable receiver/transmitter unit according to claim 20 having an antenna which is an integral part of said portable receiver/transmitter unit, which antenna is capable of propagating said signal to the far end of the aircraft.

23. A portable receiver/transmitter unit according to claim 20 having means to receive, decode, and display information transmitted by other portable/transmitted units.

24. A portable receiver/transmitter unit according to claim 21 having means to receive information comprising an antenna, a receiver section, and a processor section.

25. A portable receiver/transmitter unit according to claim 24 wherein said antenna has detecting means for detecting a signal from another portable receiver/transmitter unit at the far end of the aircraft, and routing means for routing said signal to said receiver section.

26. A portable receiver/transmitter unit according to claim 25 wherein said detecting means for removing the intelligence from said signal and said routing means comprises a pulse train to said processor section.

27. A portable receiver/transmitter unit according to claim 23 wherein said means to display comprises a digital display mounted on the face of said portable receiver/transmitter unit.

28. A portable receiver/transmitter unit according to claim 23 wherein said means to display comprises lights including at least one indicator light, at least one one of which illuminates depending on the severity of the situation that is broadcast by said sending portable receiver/transmitter unit.

29. A portable receiver/transmitter according to claim 27 in which said digital display displays the number of the sending portable receiver/transmitter unit.

30. A portable receiver/transmitter unit according to claim 13 having means to provide a tactile alert to the wearer in the event another portable receiver/transmitter unit is activated.

31. A portable receiver/transmitter unit according to claim 30 wherein said tactile alert comprises a vibrator assembly.

32. A portable receiver/transmitter unit according to claim 30 wherein said tactile alert comprises hidden, guarded buttons located at strategic points within the aircraft.

33. A portable receiver/transmitter unit according to claim 32 wherein said tactile alert buttons include a cover to guard against accidental activation.

34. A portable receiver/transmitter unit according to claim 13 having means to prevent inavertent actuation of said buttons.

* * * * *